United States Patent
Yamasaki et al.

(10) Patent No.: US 10,468,072 B2
(45) Date of Patent: Nov. 5, 2019

(54) PROTECTION OF DISK DRIVE FROM EXTERNAL ELECTROMAGNETIC WAVES

(71) Applicant: KABUSHIKI KAISHA TOSHIBA, Tokyo (JP)

(72) Inventors: Nobuyoshi Yamasaki, Kamakura Kanagawa (JP); Toshihiro Tsujimura, Ota Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/979,525

(22) Filed: May 15, 2018

(65) Prior Publication Data

US 2018/0268875 A1    Sep. 20, 2018

Related U.S. Application Data

(62) Division of application No. 15/391,746, filed on Dec. 27, 2016, now abandoned.

(60) Provisional application No. 62/319,683, filed on Apr. 7, 2016.

(51) Int. Cl.
  *G11B 33/14*    (2006.01)
  *G11B 33/02*    (2006.01)
  *G11B 25/04*    (2006.01)

(52) U.S. Cl.
  CPC ........ *G11B 33/1493* (2013.01); *G11B 25/043* (2013.01); *G11B 33/027* (2013.01); *G11B 33/1466* (2013.01)

(58) Field of Classification Search
  None
  See application file for complete search history.

(56) References Cited

U.S. PATENT DOCUMENTS

| | | | |
|---|---|---|---|
| 2,065,651 A | 12/1936 | Burton | |
| 2,604,507 A | 7/1952 | Tyson | |
| 4,567,317 A | 1/1986 | Ehrlich et al. | |
| 4,761,516 A | 8/1988 | Reichert | |
| 4,952,752 A | 8/1990 | Roun | |

(Continued)

FOREIGN PATENT DOCUMENTS

| | | | |
|---|---|---|---|
| JP | 63112881 A | * | 5/1988 |
| JP | H05-012837 | | 1/1993 |

(Continued)

OTHER PUBLICATIONS

Choi et al., "Electromagnetic wave shielding structure for hard disk drive," KR 618896 B1, published on Sep. 1, 2006. (Year: 2006).*

*Primary Examiner* — William J Klimowicz
(74) *Attorney, Agent, or Firm* — Kim & Stewart LLP (57) ABSTRACT

A disk drive includes a metal base that has a rectangular bottom wall and side walls formed on each side of the rectangular bottom wall, the side walls including a first side wall on a shorter side, a metal cover that is fixed to the metal base with a plurality of metal screws, including two screws disposed at opposite ends of the side wall, a gap being formed between an upper end of the first side wall and the metal cover, a magnetic disk disposed on the metal base, at a position offset from a center of the metal base in a longitudinal direction towards the first side wall, and a head. The first side wall and the metal cover are electrically connected at an intermediate position of the first side wall between said opposite ends of the first side wall.

13 Claims, 8 Drawing Sheets

(56) References Cited

U.S. PATENT DOCUMENTS

| | | | |
|---|---|---|---|
| 5,008,487 A | 4/1991 | Shimmyo | |
| 5,014,160 A | 5/1991 | McCoy, Jr. | |
| 5,015,802 A | 5/1991 | Chi | |
| 5,095,177 A | 3/1992 | Johnson | |
| 5,187,621 A * | 2/1993 | Tacklind | G11B 23/505 174/384 |
| 5,276,577 A | 1/1994 | Brooks et al. | |
| 5,301,075 A | 4/1994 | Takemoto | |
| 5,506,374 A | 4/1996 | Kawakami | |
| 5,600,509 A | 2/1997 | Kawakami | |
| 5,917,710 A | 6/1999 | Maatta | |
| 6,631,049 B2 | 10/2003 | Satoh et al. | |
| 6,661,603 B1 | 12/2003 | Watkins et al. | |
| 6,704,161 B1 | 3/2004 | Pham et al. | |
| 7,209,317 B1 | 4/2007 | Berding et al. | |
| 7,630,170 B2 | 12/2009 | Hayakawa et al. | |
| 7,687,725 B2 | 3/2010 | Hogan | |
| 7,701,663 B2 | 4/2010 | Oh et al. | |
| 8,873,231 B2 * | 10/2014 | Ajmani | G11B 33/1493 361/679.33 |
| 2003/0043499 A1 | 3/2003 | Shimomura et al. | |
| 2003/0081348 A1 | 5/2003 | Watanabe et al. | |
| 2005/0157420 A1 * | 7/2005 | Hatanaka | G11B 33/121 360/97.13 |
| 2005/0270690 A1 | 12/2005 | Gunderson | |
| 2007/0139814 A1 | 6/2007 | Oh et al. | |
| 2007/0177308 A1 * | 8/2007 | Kimura | G11B 25/043 360/245.9 |
| 2008/0158851 A1 | 7/2008 | Cochrane | |
| 2008/0165489 A1 * | 7/2008 | Ho | G11B 33/1493 361/748 |
| 2013/0155603 A1 * | 6/2013 | Kaneko | G11B 25/043 361/679.33 |
| 2017/0294215 A1 * | 10/2017 | Yamasaki | G11B 33/027 |

FOREIGN PATENT DOCUMENTS

| | | |
|---|---|---|
| JP | 2001-291985 | 10/2001 |
| JP | 2002-353651 | 12/2002 |
| JP | 2006-203150 | 8/2006 |
| KR | 100618896 | 8/2006 |

* cited by examiner

PROTECTION OF DISK DRIVE FROM EXTERNAL ELECTROMAGNETIC WAVES

CROSS-REFERENCE TO RELATED APPLICATIONS

This application is a division of U.S. patent application Ser. No. 15/391,746, filed on Dec. 27, 2016, which claims the benefit of U.S. Provisional Application No. 62/319,683, filed on Apr. 7, 2016, the entire contents of each of which are incorporated herein by reference.

FIELD

Embodiments described herein relate to a disk drive, in particular, protection of a disk drive from external electromagnetic waves.

BACKGROUND

A hard disk drive (HDD) typically includes a rectangular housing, a recording medium (disk) disposed in the housing, and a magnetic head which reads/writes data from/to the recording medium. Further, the housing typically includes a rectangular base and a top cover formed in the shape of a plate and screwed to the base. When such an HDD is used in an external device, when an external magnetic field such as electromagnetic waves is applied from the external device to the housing of the HDD, noise may negatively affect operation of the HDD, i.e., data reading/writing by the magnetic head on the disk. It is therefore preferable that the HDD has capability to inhibit magnetic field resonance occurring because of an external magnetic field, and prevent the magnetic field resonance from interfering with its operation.

DETAILED DESCRIPTION

Various embodiments will be described hereinafter with reference to the accompanying drawings.

In general, according to an embodiment, a disk drive includes a metal base that has a rectangular bottom wall and side walls formed on each side of the rectangular bottom wall, the side walls including a first side wall on a shorter side, a metal cover that is fixed to the metal base with a plurality of metal screws, including two screws disposed at opposite ends of the side wall, a gap being formed between an upper end of the first side wall and the metal cover, a magnetic disk disposed on the metal base, at a position offset from a center of the metal base in a longitudinal direction towards the first side wall, and a head configured to write data to and read data from the magnetic disk. The first side wall and the metal cover are electrically connected at an intermediate position of the first side wall between said opposite ends of the first side wall.

(First Embodiment)

A hard disk drive (HDD) according to a first embodiment will be described in detail.

Figure 1:
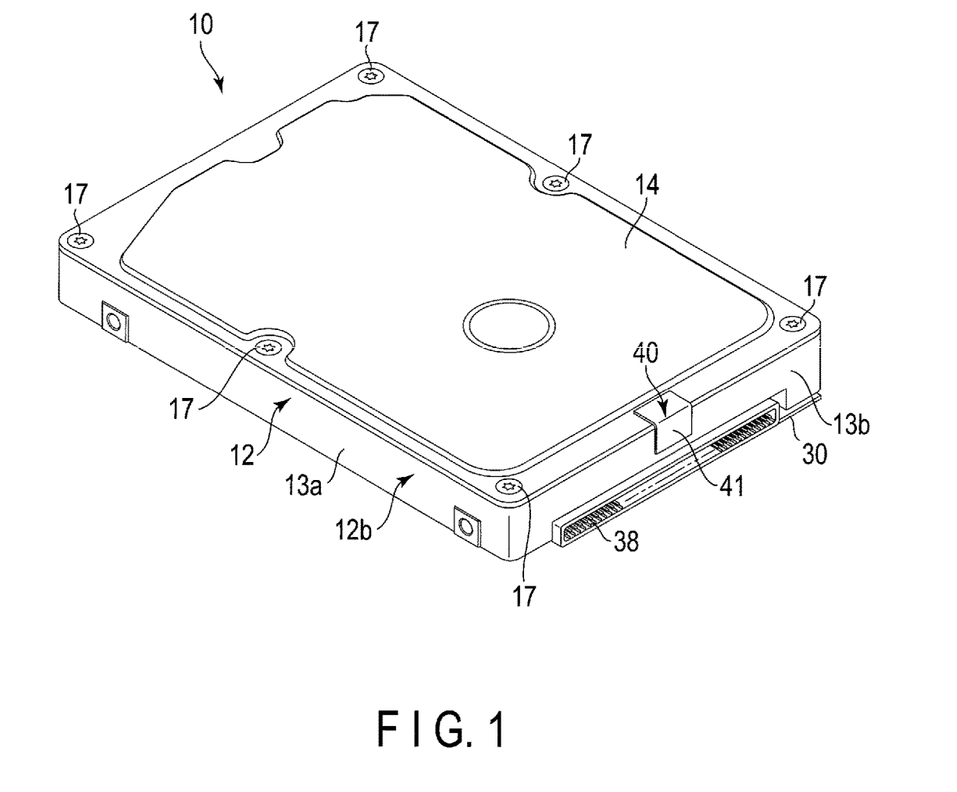
FIG. 1 is a perspective view of a hard disk drive (HDD) according to a first embodiment.
Figure 2:
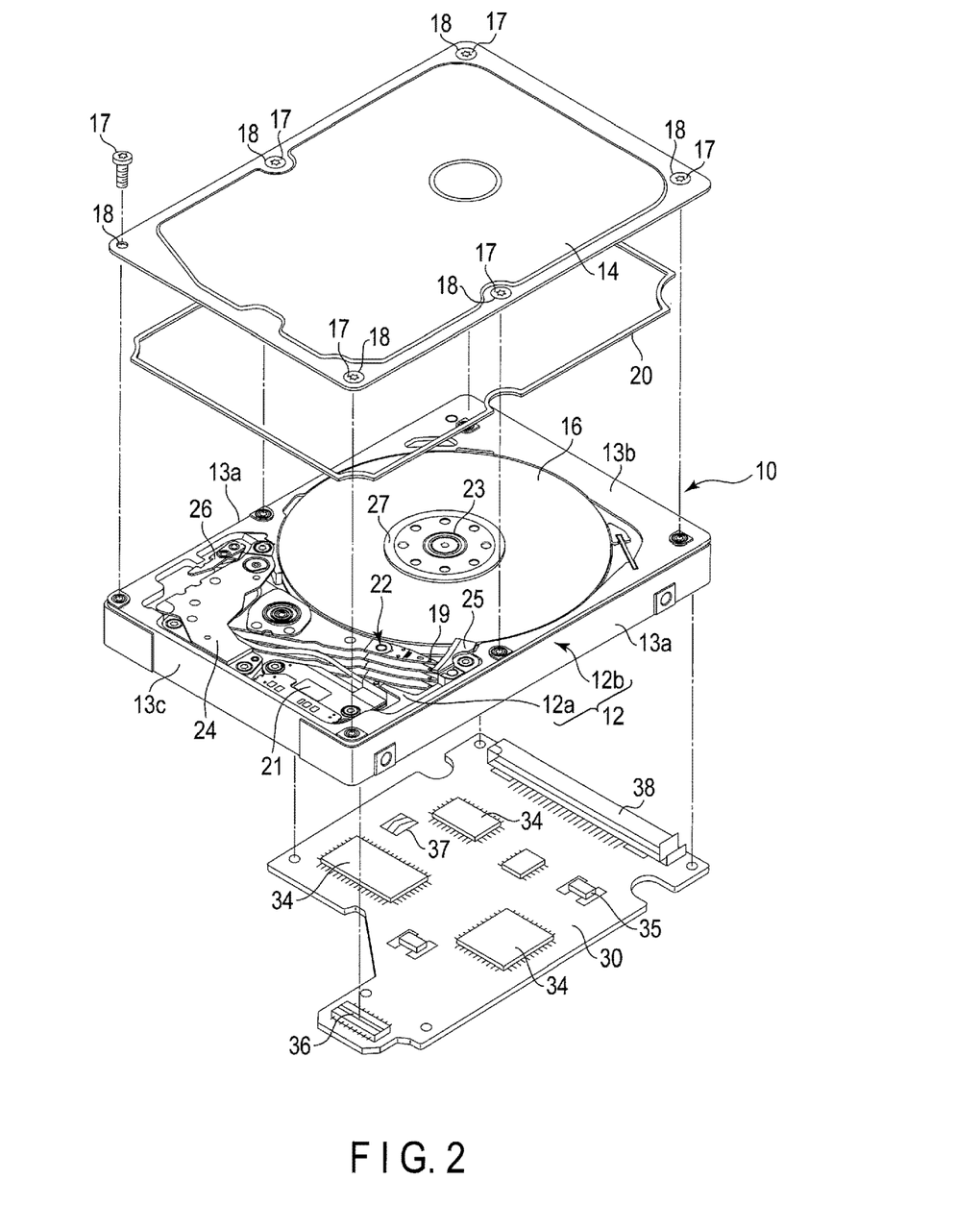
FIG. 2 is a perspective exploded view of the HDD.
Figure 3:
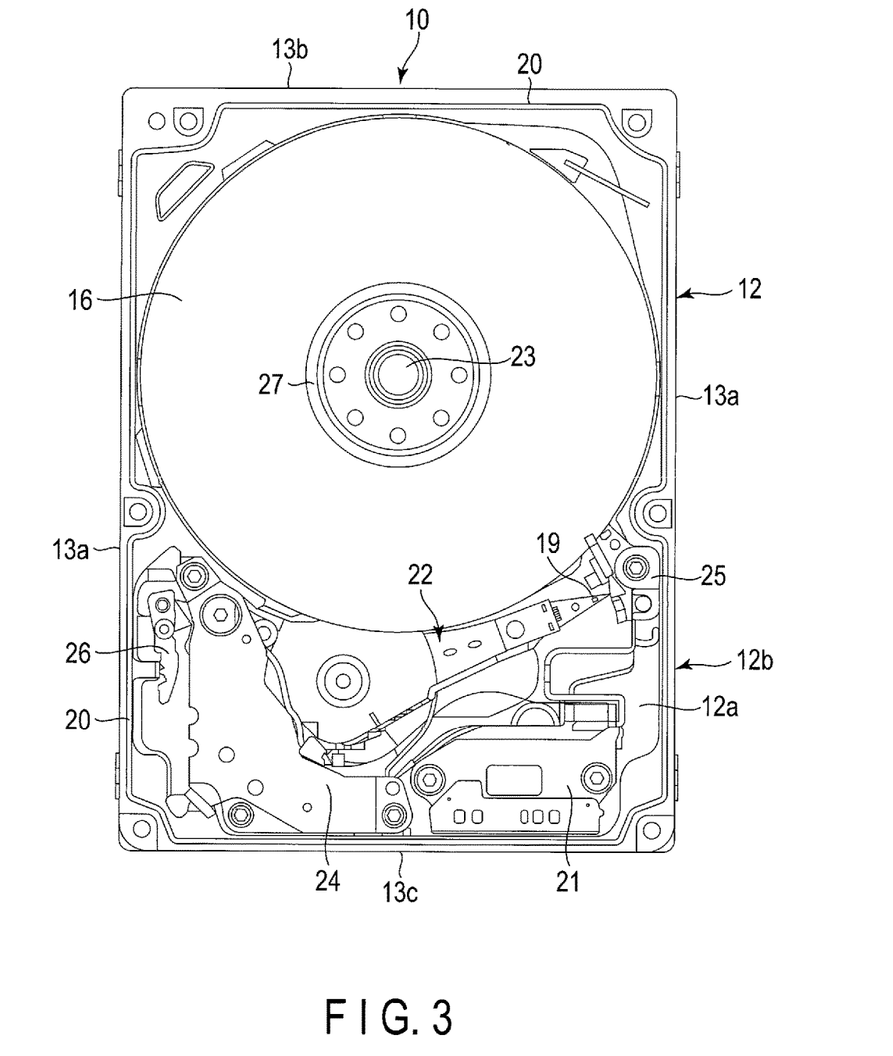
FIG. 3 is a plan view of an inner structure of the HDD.

FIG. 1 is a perspective view of the HDD according to the first embodiment, FIG. 2 is a perspective exploded view of the HDD, and FIG. 3 is a plan view of an inner structure of the HDD.

As shown in FIGS. 1 to 3, the HDD includes a housing 10. The housing 10 includes a base 12 formed in a shape of a rectangular box which is open on its upper side, and a top cover 14 formed in a shape of a rectangular plate. The top cover 14 is secured to the base 12 by a plurality of screws 17 and closes an upper opening of the base 12. The base 12 includes a rectangular bottom wall 12a and side walls 12b provided along peripheral edges of the bottom wall 12a, and those walls 12a, 12b are formed of a metallic material such as aluminum or stainless and formed integrally with each other. The side walls 12b of the base 12 include a pair of long side walls 13a located opposite to each other and first and second short side walls 13b and 13c located opposite to each other.

The top cover 14 has substantially the same size as the bottom wall 12a of the base 12 and is formed by pressforming, for example, a stainless plate. At four corner portions of the top cover 14 and substantially center portions of long sides of the top cover 14, through holes 18 are formed (See FIG. 2). The top cover 14 is fastened to the side walls 12b of the base 12 by the screws 17, which are inserted in the through holes 18. That is, the top cover 14 is fastened to the base 12 by the screws 17 at both ends of the first short side wall 13b, both ends of the second short side wall 13c, and substantially central portions of the long side walls 13a.

A gasket 20 that is formed in the shape of a frame is sandwiched between an upper end surface of the side walls 12b of the base 12 and an outer peripheral edge portion of the top cover 14. The gasket 20 is used to seal space between the base 12 and the top cover 14 in an airtight manner.

As shown in FIGS. 2 and 3, in the housing 10, for example, three magnetic disks 16 are disposed as recording mediums, and a spindle motor 23 is disposed as a drive unit which supports and rotates the magnetic disks 16. The spindle motor 23 is disposed on the bottom wall 12a. Each of the magnetic disks 16 has, for example, a diameter of 88.9 mm (3.5 inches), and includes magnetic recording layers (magnetic recording surfaces) on both surfaces (upper and lower surfaces) thereof. The magnetic disks 16 are engaged coaxially with a hub (not shown) of the spindle motor 23, and clamped by a clamp spring 27 to be fixed to the hub. Thereby, the magnetic disks 16 are supported in such a way as to be located in parallel with the bottom wall 12a of the base 12. The magnetic disks 16 are rotated at a predetermined speed by the spindle motor 23. Also, within the housing 10, the magnetic disks 16 are displaced from a center portion of the base 12 in the longitudinal direction thereof, toward the short side wall 13b. Thereby, the magnetic disks 16 are located adjacent to the short side wall 13b, i.e., away from the short side wall 13c.

In the housing 10, a plurality of magnetic heads 19 each of which corresponds to one of the magnetic disks 16, and a carriage assembly 22 are disposed. Each of the magnetic heads 19 reads/writes data from/to the corresponding magnetic disk 16, and the carriage assembly 22 supports the magnetic heads 19 in such a way as to allow the magnetic heads 19 to be movable relative to the magnetic disks 16. Furthermore, in the housing 10, a voice coil motor (hereinafter referred to as VCM) 24, a ramp load mechanism 25, a latch mechanism 26, and a flexible printed circuit (FPC) board unit 21 are disposed. The VCM 24 rotates and positions the carriage assembly 22. The ramp load mechanism 25 holds the magnetic heads 19 in an unload position located away from the magnetic disks 16, when the magnetic heads 19 are moved to outermost circumferential portions of the magnetic disks 16. The latch mechanism 26 holds the carriage assembly 22 in a retreat position when an impact or the like is applied to the HDD. On the FPC unit 21, electronic components such as a conversion connector are mounted. The carriage assembly 22, the VCM 24, the ramp load mechanism 25, the latch mechanism 26, and the FPC unit 21 are disposed in space between the magnetic disks 16 and the short side wall 13c of the base 12.

As shown in FIGS. 1 and 2, the HDD includes a printed circuit board (control circuit board) 30. The printed circuit board 30 is screwed to an outer surface (bottom surface) of the bottom wall 12a of the base 12, and located opposite an inner surface of the bottom wall 12a of the base 12 that faces the disks 16, with a slight gap between them. Between the outer surface of the bottom wall 12a of the base 12 and the printed circuit board 30, an insulating sheet (film) (not shown) is disposed as an insulating member.

On an inner surface of the printed circuit board 30 (i.e., a surface facing the base 12), a semiconductor chip and semiconductor elements 34 which form a control unit, and electronic components such as a rotation vibration sensor (or acceleration sensor) 35 are mounted. At one edge of the printed circuit board 30 in the longitudinal direction thereof, a connector 36 is disposed, and at the other edge of the printed circuit board 30 in the longitudinal direction, an interface connector 38 connectable to an external device is disposed. At a center portion of the printed circuit board 30 in the longitudinal direction thereof, a connection terminal 37 for the spindle motor 23 is disposed.

When the printed circuit board 30 is attached to the base 12, the connector 36 is connected to the conversion connector mounted on the FPC unit 21. The interface connector 38 is located close to the first short side wall 13b of the housing 10 and a conductive portion 40. For example, a rectangular recess portion is formed in the first short side wall 13b on a side closer to the bottom wall 12a, and an interface connector 38 fits in the recess portion. The connecter terminal 37 is connected to a connection terminal connected to the spindle motor 23. The control unit of the printed circuit board 30 controls operations of the VCM 24 and magnetic heads 19 using the FPC unit 21, and controls an operation of the spindle motor 23 through the connection terminal 37.

Figure 4:
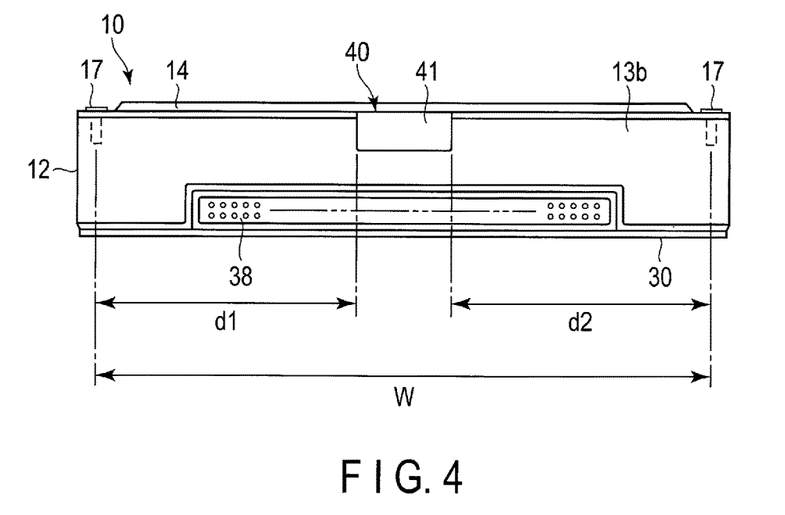
FIG. 4 is a side view of the HDD on a short side thereof.

FIG. 4 is a side view of the HDD, where the short side wall 13b is located. As shown in FIGS. 1 and 4, the HDD includes the conductive portion 40, which electrically connects the first short side wall 13b of the base 12 and the top cover 14. In the first embodiment, the conductive portion 40 is formed of a tape having electrical conductivity such as a copper tape 41. The copper tape 41 is stuck to an outer surface of the first short side wall 13b and an outer surface of the top cover 14 and electrically connects the first short side wall 13b and the top cover 14. The copper tape 41 is stuck to an intermediate portion of the first short side wall 13b in the longitudinal direction thereof, i.e., an area between screwed portions of both ends of the first short side wall 13b, and electrically connects the intermediate portion to the top cover 14.

As shown in FIG. 4, in the first embodiment, d1=d2 is satisfied, where d1 and d2 are distances between the screwed portions (conducting positions) of the first short side wall 13b and the copper tape 41, respectively. In the first embodiment, d1 and d2 are set to 70 mm, so that a natural frequency of the first short side wall 13b becomes 2 GHz or more. If the natural frequency of the first short side wall 13b is less than 2 GHz, noise may enter the HDD from the outside thereof and cause the HDD to malfunction. This is undesirable.

In the HDD according to the first embodiment, a reference value of the natural frequency is set to 2 GHz for the following reason. It is preferable that an electronic device such as an HDD has a high electromagnetic susceptibility (EMS) to inhibit magnetic field resonance that can be caused by an external magnetic field, and prevent the magnetic field resonance from interfering with its operation. In a test for checking EMS, for example, an E-field test (a test based on radio standards), a range (a value less than reference value) of the natural frequency, in which EMS decreases, is set in each of devices. If the natural frequency of a device is less than the above reference value, i.e., it is within the above range, noise that enters the device is more likely cause malfunction of the device. In order to obtain a high EMS, it is necessary that the natural frequency of the device is greater than or equal to the reference value. In view of this point, in the HDD according to the first embodiment, the reference value of the natural frequency is assumed to be, for example, 2 GHz, and the distances d1 and d2 are set to 70 mm so that the natural frequency of the first short side wall 13b becomes greater than or equal to the reference value, i.e., 2 GHz.

Next, influence of a natural frequency of the first short side wall 13b on the HDD, i.e., relationship between distances d1 and d2 and the natural frequency, will be described.

Figure 5:
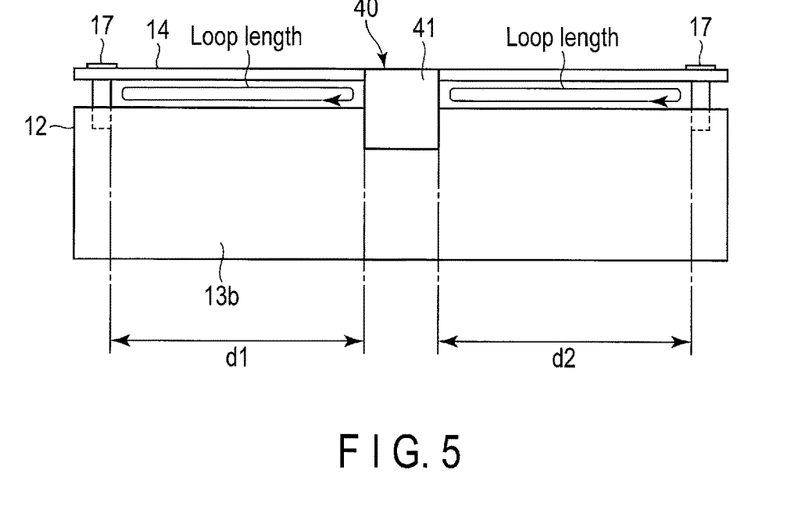
FIG. 5 schematically illustrates space formed between a top cover and a short side wall of the base of the HDD.

FIG. 5 schematically shows the first short side wall 13b and the top cover 14 of the HDD. As shown in FIG. 5, in the outside of the gasket 20, a slight gap (opening region) is present between the upper end surface of the first short side wall 13b and a lower surface of the top cover 14. Because of gaps between the screws 17 and the conductive portion 40 (conductive tape 41), peripherals of the gaps along the top cover 14, the screws 17, the first short side wall 13b, and the conductive tape 41 form loops, and each of the loops functions as a loop antenna. The length (loop length) of a circuit of each of the loop antennas is formed to correspond to the natural frequency of the first short side wall 13b, and be coincident with wavelength λ of electromagnetic waves generated in the opening region when electromagnetic waves are applied from the outside of the HDD.

Where the wavelength is λ(m)=C (the velocity of light)/f (Hz), the velocity of light C is 299,792,458 m/s, and f (Hz) is 2×10$^9$ Hz (2 GHz), the wavelength λ is approximately 140 mm. The loop length is formed to be coincident with the wavelength λ. Thus, each of the lengths (distances) d1 and d2 of the gaps is 70 mm or less.

The relationship between the wavelength λ and the natural frequency (Hz) satisfies the wavelength=propagation velocity/frequency, and in vacuum, electromagnetic wave=speed of light. However, in air, electromagnetic waves become slightly slower; in the other mediums, they become further slower, and electromagnetic wave=speed of light/√(ε), where ε is a relative permittivity of the medium.

On the other hand, if the conductive portion 40 or the conductive tape 41 is absent, the length of the peripherals of the gaps between the upper end surface of the short side wall 13b and the top cover 14, i.e., the loop antenna length or the loop length, would be approximately 200 mm, and frequency=propagation velocity/wavelength=1.5 GHz. That is, the natural frequency of the above gap would become smaller than the reference value (2 GHz). This is undesirable.

According to the HDD having the above structure, the conductive portion 40 (copper tape 41), which is electrically connected to the top cover 14, is provided at the intermediate portion of the first short side wall 13b of the housing 10, thereby improving an electromagnetic shielding characteristic of the housing 10. Thus, the HDD can inhibit magnetic field resonance occurring because of an external magnetic field, and improves electro magnetic susceptibility (EMS).

Figure 6:
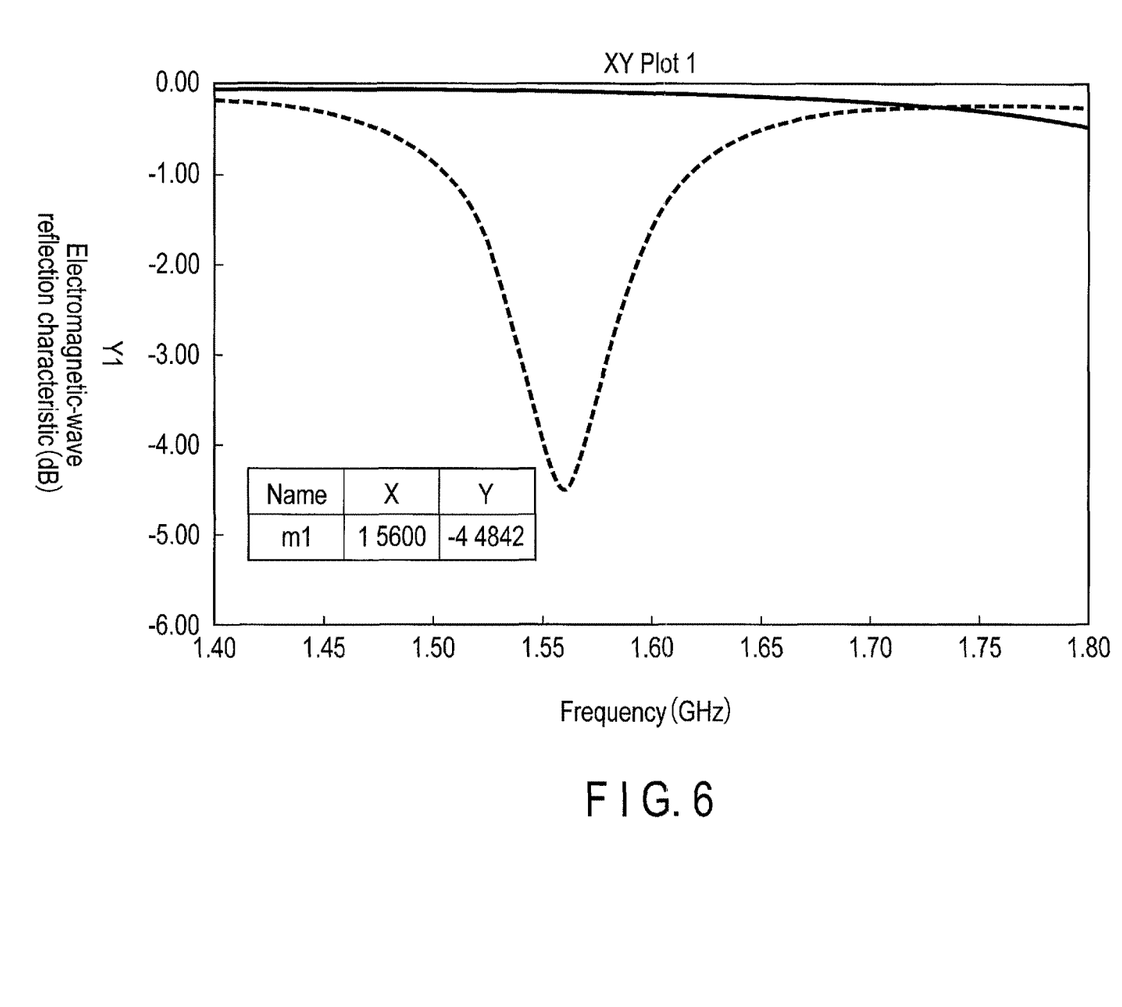
FIG. 6 illustrates an electromagnetic-wave reflection characteristic of the HDD when electromagnetic waves (magnetic field) are applied to the HDD from the outside thereof.

FIG. 6 shows a reflection characteristic of electromagnetic waves which are applied to the first short side wall 13b of the HDD according to the first embodiment from the outside of the HDD. In FIG. 6, the vertical axis represents the electromagnetic-wave reflection characteristic (dB) (reflection characteristic of the entire housing), and the horizontal axis represents the frequency (GHz) of electromagnetic waves. The reflection characteristic of 0 dB means that applied electromagnetic waves are all reflected. Also, the reflection characteristic of minus dB means that noise (electromagnetic waves) enters the housing 10. As indicated by a solid line in FIG. 6, in the HDD according to the first embodiment, the reflection characteristic is nearly 0 dB in an entire width region of the first short side wall 13b. That is, noise is sufficiently reflected, and is prevented to enter into the housing 10.

On the other hand, as indicated by a broken line in FIG. 6, in an HDD according to a comparative example, which includes no conductive portion 40, the reflection characteristic is significantly greater minus dB around a central portion of a first short side wall 13b in the width direction thereof, which means noise enters into the housing.

By virtue of the above, the HDD according to the first embodiment can be effectively protected against electromagnetic waves from the outside, thus improving EMS.

Next, HDDs according to another embodiment will be described. In the following description, elements identical to those in the first embodiment will be denoted by the same reference numerals as in the first embodiment, respectively, and their detailed description will be omitted or simplified. Elements different from those of the first embodiment will be mainly explained in detail.

(Second Embodiment)

Figure 7:
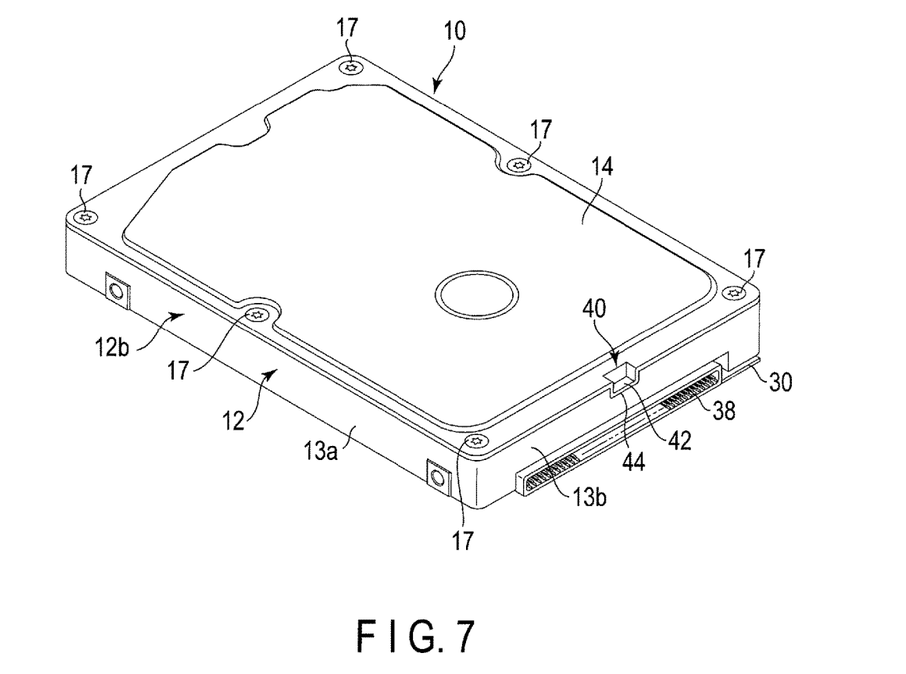
FIG. 7 is a perspective view of a hard disk drive (HDD) according to a second embodiment.
Figure 8:
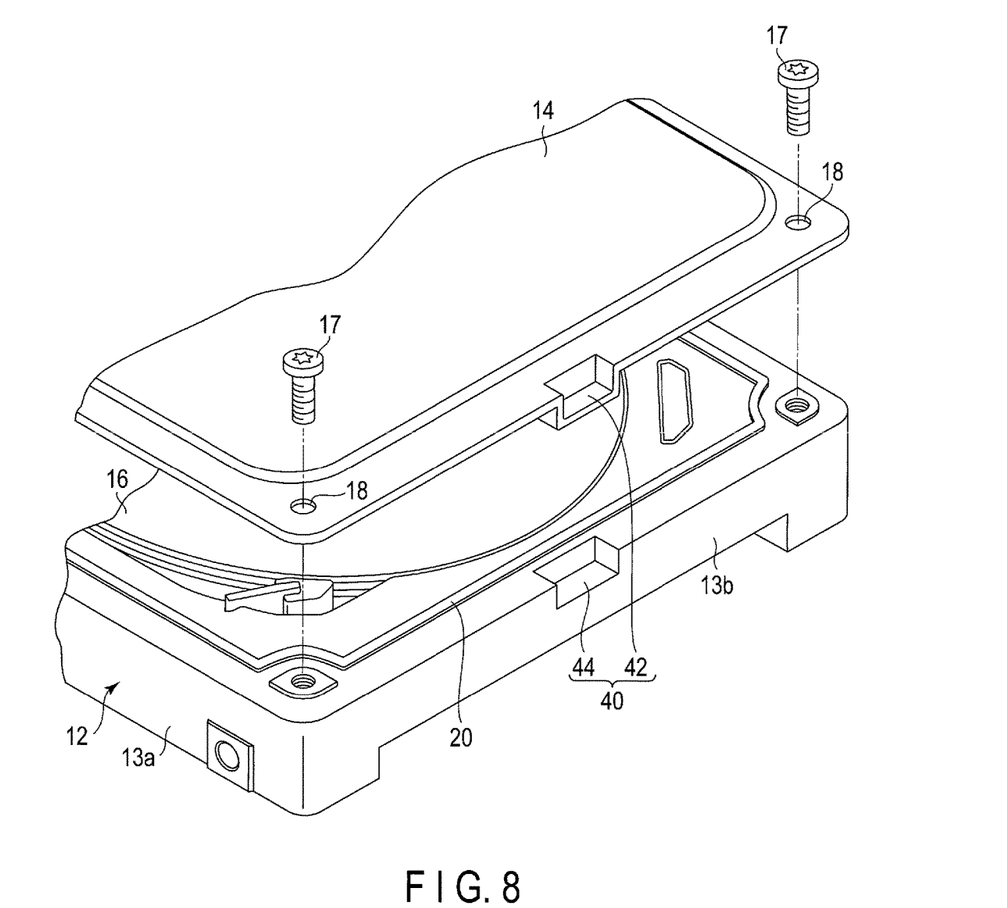
FIG. 8 is a perspective exploded view of the HDD according to the second embodiment.
Figure 9:
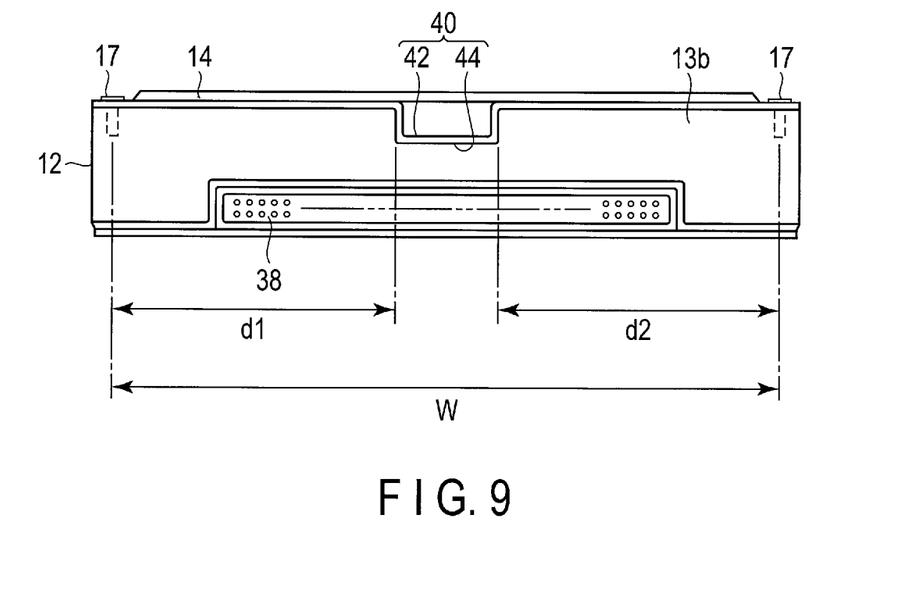
FIG. 9 is a side view of the HDD on a short side thereof.

FIG. 7 is a perspective view of an HDD according to a second embodiment. FIG. 8 is a perspective exploded view of a side of the HDD according to the second embodiment, where a first short side wall 13b is provided. FIG. 9 is a side view of the HDD on a side where the first short side wall 13b is provided.

As shown in FIGS. 7 and 8, in the second embodiment, a conductive portion 40 of a housing 40 includes a convex portion 42 formed in a side edge portion of a short side of a top cover 14, and a concave portion 44 formed in an upper portion of the first short side wall 13b of a base 12. The convex portion 42 is formed as a rectangular convex portion projecting toward the base 12, by carrying out bending processing or drawing processing on part of the top cover 14. Furthermore, the convex portion 42 is provided at a substantially central portion of the short side of the top cover 14.

The concave portion 44 of the first short side wall 13b is formed in a position, a shape, and a size corresponding to those of the convex portion 42 of the top cover 14. To be more specific, the concave portion 44 is substantially rectangular, formed at a central portion of the first short side wall 13b in the longitudinal direction thereof, and located outside of gasket 20.

When the top cover 14 is attached to and screwed on the base 12, the convex portion 42 of the top cover 14 is engaged with or fitted in the concave portion 44 of the first short side wall 13b, and in contact with a substantially central portion of the first short side wall 13b. Thereby, the central portion of the first short side wall 13b is electrically connected to the top cover 14 via the conductive portion 40.

As shown in FIG. 9, in the first short side wall 13b, d1=d2, where d1 and d2 are distances between positions of screwed portions (positions of screws 17) and the conductive portion 40, respectively. In the second embodiment also, d1 and d2 are set to 70 mm so that the loop length becomes 2 GHz or more, as in the first embodiment and the structure as shown in FIG. 5. When the natural frequency at the first short side wall 13b become less than 2 GHz, noise may enter the HDD from the outside thereof, and cause the HDD to malfunction. This is undesirable.

In the second embodiment, the other structural features are the same as those of the first embodiment.

According to the HDD having the above structure, in an intermediate portion of the first short side wall 13b of the housing 10, the conductive portion 40, which is electrically connected to the top cover 14, is provided, thereby improving a magnetically shielding characteristic of the housing 10. For that reason, the HDD can inhibits magnetic field resonance from occurring because of an external magnetic field, and improve electro magnetic susceptibility (EMS). In addition, in the second embodiment also, it is possible to obtain the same advantage as in the first embodiment.

With respect to the HDD according to the second embodiment, a reflection characteristic for electromagnetic waves was measured, and the same measurement result (simulation result) as shown in FIG. 6 was obtained.

It should be noted that in the second embodiment, the shapes of the convex portion 42 and the concave portion 44 included in the conductive portion 40 are not limited to the rectangle, and can be selected from various shapes. If the convex portion 42 of the top cover 14 is sufficient to establish stable electrical connection to the base 12, the concave portion 44 may be omitted. For example, the height of the convex portion 42 may be the same as that of the gap between the upper end surface of the side wall of the base and the top cover, and the convex portion 42 may be in contact with the upper end surface of the side wall.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the disk drive, the number of magnetic disks is not limited to three, i.e., may be one, two, or four or more. Also, the number of magnetic heads may be increased or decreased in accordance with the number of magnetic disks. The size of each of the magnetic disks is not limited to 3.5 inches, i.e., may be another size. The materials, shapes, sizes, etc., of the elements forming the disk drive are not limited to those disclosed in the above embodiments, and can be variously changed as occasion demands. In addition, the location of the conductive portion is not limited to the intermediate portion of the above first short side wall; i.e., may be provided in a region between screwed portions of a long side wall or another short side wall.

What is claimed is:

1. A disk drive comprising:
a metal base comprising a bottom wall and a side wall on the bottom wall, the side wall comprising a first side wall on one side of the bottom wall;
a metal cover on and above the metal base, having a protrusion extending downwardly toward the first side wall and integrally formed at an intermediate position of a side portion of the metal cover, the protrusion having a bottom planar surface that is in contact with the first side wall to electrically connect the metal cover to the metal base wherein the first side wall includes a recessed portion in which the protrusion fits;
at least two screws reaching the side wall through the metal cover at opposite ends of the metal cover;
a magnetic disk disposed on the metal base; and
a head configured to write data to and read data from the magnetic disk.

2. The disk drive according to claim 1, further comprising:
a gasket between the side wall and the metal cover.

3. The disk drive according to claim 1, further comprising:
a gasket between the side wall and the metal cover, wherein
the protrusion of the metal cover is located outside a region of the metal cover that is in contact with the gasket.

4. The disk drive according to claim 1, further comprising:
a connector along the first side wall.

5. The disk drive according to claim 1, wherein the side portion and the protrusion of the metal cover, the first side wall, and the two screws form at least a part of two loop antennas.

6. The disk drive according to claim 1, wherein
the protrusion engages with the recessed portion arranged on a first side of the first side wall, the recessed portion having an upper planar surface that is in contact with the bottom planar surface of the protrusion.

7. The disk drive according to claim 6, wherein
the first side is opposite to a second side of the first side wall at which a connector is arranged.

8. A disk drive comprising:
a metal base comprising a bottom wall and a side wall on the bottom wall, the side wall comprising a first side wall on one side of the bottom wall;
a metal cover on and above the metal base, having a protrusion extending downwardly toward the first side wall and integrally formed at an intermediate position of a side portion of the metal cover, the protrusion having a bottom planar surface that is in contact with the first side wall to electrically connect the metal cover to the metal base wherein the first side wall includes a recessed portion in which the protrusion fits;
a magnetic disk disposed on the metal base; and
a head configured to write data to and read data from the magnetic disk,
wherein
the side portion and the protrusion of the metal cover and the first side wall form at least a part of two loop antennas.

9. The disk drive according to claim 8, further comprising:
a gasket between the side wall and the metal cover.

10. The disk drive according to claim 8, further comprising:
a gasket between the side wall and the metal cover, wherein
the protrusion of the metal cover is located outside a region of the metal cover that is in contact with the gasket.

11. The disk drive according to claim 8, further comprising:
a connector along the first side wall.

12. The disk drive according to claim 8, wherein
the protrusion engages with the recessed portion arranged on a first side of the first side wall, the recessed portion having an upper planar surface that is in contact with the bottom planar surface of the protrusion.

13. The disk drive according to claim 12, wherein
the first side is opposite to a second side of the first side wall at which a connector is arranged.

\* \* \* \* \*